United States Patent [19]

Martin et al.

[11] Patent Number: 5,040,177
[45] Date of Patent: Aug. 13, 1991

[54] ACCESS NETWORK FOR A CORDLESS TELEPHONE SERVICE

[75] Inventors: Maurice Martin; Jean-Bernard Kerihuel; Jean-Claude Pennanec'h, all of Paris, France

[73] Assignee: Alcatel Cit, Paris, France

[21] Appl. No.: 552,965

[22] Filed: Jul. 16, 1990

[30] Foreign Application Priority Data

Jul. 17, 1989 [FR] France .............................. 89 09578

[51] Int. Cl.[5] .......................... H04M 11/00; H04J 3/12
[52] U.S. Cl. ..................................... 370/110.1; 379/61
[58] Field of Search ................... 370/58.1, 58.2, 58.3, 370/77, 79, 94.1, 94.3, 110.1; 340/825.3, 825.34; 379/57, 58, 61, 62, 63, 93, 94, 258, 268, 269

[56] References Cited

U.S. PATENT DOCUMENTS

| 4,748,655 | 5/1988 | Thrower et al. | 379/57 |
| 4,866,703 | 9/1989 | Black et al. | 370/110.1 |
| 4,879,740 | 11/1989 | Nagashima et al. | 379/61 |
| 4,980,907 | 12/1990 | Raith et al. | 379/61 |

OTHER PUBLICATIONS

Commutation & Transmission, No. 2, 1989, pp. 5-22, Paris, France; J. Dunogue et al.: "Du Concept a l'application du Reseau intelligent, Architecture et equipments d'Alcatel".

Eurocon 88, 8th European Conference on Electrotechnics, Stockholm, Sweden, Jun. 13-17, 1988, pp. 470-473; S. Hansen et al.: "The GSM Base Station System and the Related Equipment".

Commutation & Transmission, No. 4, 1988, pp. 17-30, Paris, France; M. Ballard et al.: "ECR 900, La Radiotelephonie Numerique Europeenne d'Alcatel".

38th IEEE Vehicular Technology Conference, Philadelphia, U.S.A., Jun. 15-17, 1988, pp. 30-37; W. Fuhrmann et al.: "Radio Access Protocol of the new GSM Land Mobile Communication Standard".

Primary Examiner—Douglas W. Olms
Assistant Examiner—Alpus H. Hsu
Attorney, Agent, or Firm—Sughrue, Mion, Zinn, Macpeak & Seas

[57] ABSTRACT

The cordless telephone service or "telepoint" access network comprises a distribution network constituted by cordless telephones and base stations connected by cable to the switched network, together with a service control point network including network service control points each having a subscriber data base and acting to authenticate calling subscribers, to set up calls, to localize subscribers at their own request, and to set up incoming calls. The service control point network further including a managing service control point for controlling the data bases and for providing commercial management of the service. The managing service control point is connected to the network service control points which are in turn connected to the switched network, and each base station is connected to the switched integrated services network via a 2B+D or 30B+D type channel.

3 Claims, 1 Drawing Sheet

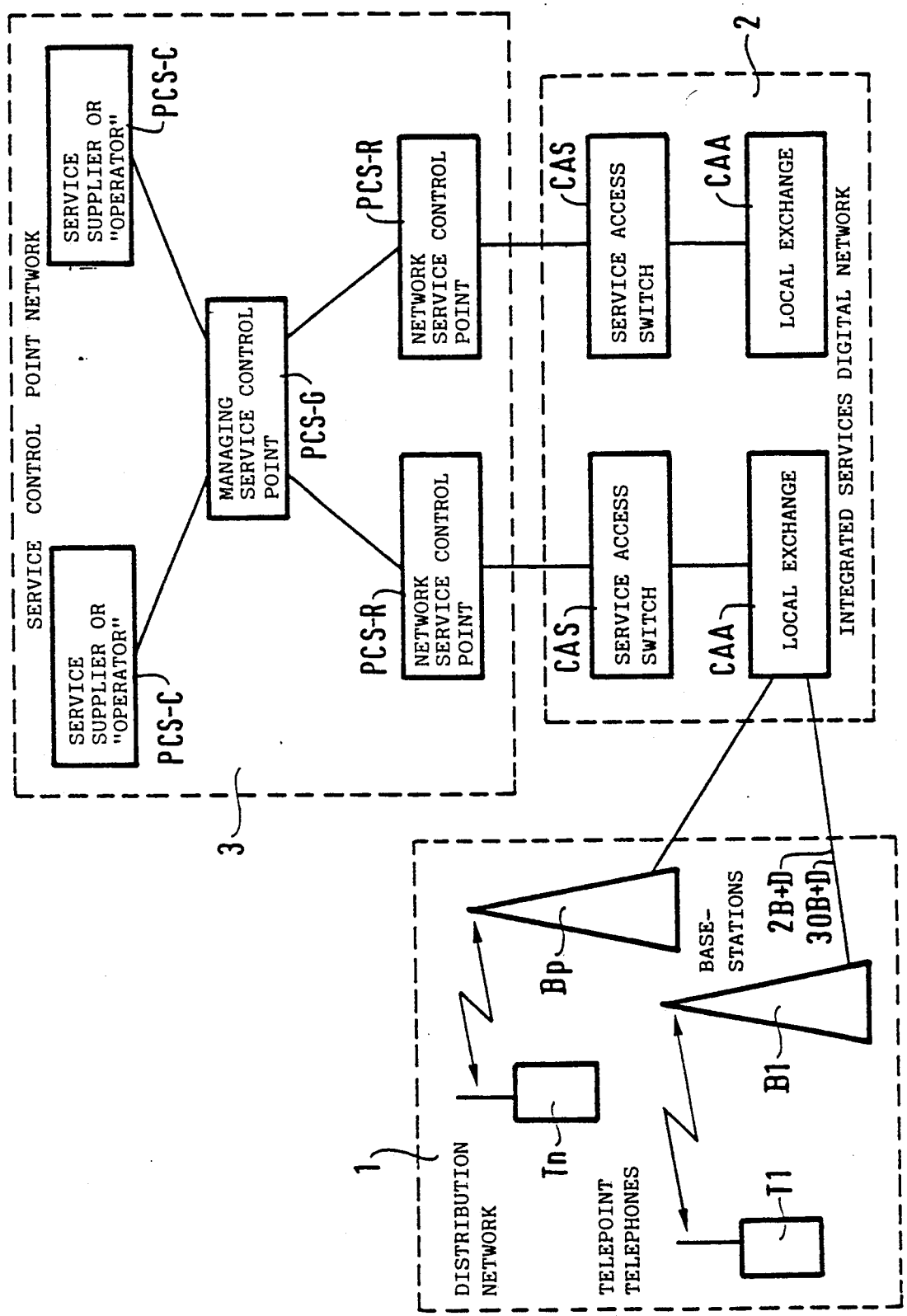

ACCESS NETWORK FOR A CORDLESS TELEPHONE SERVICE

BACKGROUND OF THE INVENTION

Cordless telephony or "telepoint" gives a telepoint subscriber access to the public switched network via the subscriber's telepoint terminal and analog radio base stations.

These base stations enable the subscriber to make a call over the public network, they provide local authentication of the calling subscriber and they control call charging. Throughout the duration of a call, the subscriber must remain within range of the base station through which the call was set up since on moving out of range the call will be cut off, there being no subscriber tracking. Such a telepoint system suffers from the following drawbacks:

calling subscriber authentication is not fully reliable, opening the door to fraud; this is because each base station is provided with its own authentication and charging means and having a multiplicity of such means can lead to fraud, particularly with respect to authentication since blacklist updating takes place once a day, at best;

there is no way of routing incoming calls to a telepoint subscriber, since the system does not know the location of the called subscriber;

call charging becomes complex if the number of "operators" and the number of base stations are large; and only a limited number of types of call can be made.

An object of the invention is to improve caller authentication.

Another object of the invention is to enable an incoming call to be routed to a telepoint subscriber.

Another object of the invention is to improve and simplify call-charging functions.

SUMMARY OF THE INVENTION

The present invention provides an access network for a cordless telephone service, the network comprising a distribution network constituted by base stations connected by cable to the public switched network, and digitial cordless telephones, with each telephone being connected by radio to the same base station throughout the duration of a call; the network further including a service control point network having:

network service control points each connected to the public switched network, and each having a data base of cordless telephone service subscribers for processing the following functions in real time: caller authentication; setting up calls; and establishing call-charging tickets; and a managing service control point controlling said data bases and providing commercial management for the cordless telephone service, said management relating to processing call-charging tickets;

said service control point network having the architecture of an intelligent network; and each base station being connected to the public switched network via a 2B+D or 30B+D type channel, said public network being an integrated services network.

BRIEF DESCRIPTION OF THE DRAWING

An embodiment of the invention is described by way of example with reference to the accompanying drawing, in which the sole FIGURE of the accompanying drawing which is a block diagram of a cordless telephone service access network of the invention.

DETAILED DESCRIPTION

The access network of the invention uses the concept of an intelligent network for implementing a cordless telephone or "telepoint" service, whereby the intelligence required by a new service is concentrated in dedicated equipment operating over the public switched network and CCITT No. 7 signalling networks and X25 packet networks. The equipment specific to such services accesses the public network via interfaces capable of taking account of all of the functions specific to the services. This concept is described in an article by J. Dunogue, JB. Kerihuel and M. Martin entitled (in translation) "The intelligent network, from concept to application: Alcatel's architecture and equipment", published in the Journal "Commutation et Transmission" No. 2-1989.

The telepoint access network comprises a distribution network 1 and a network of service control points 3.

The distribution network 1 comprises cordless telepoint telephones T1 to Tp, and each base station may be connected to a plurality of telepoint telephones simultaneously, e.g. 40 telepoint telephones. Each base station B1 to Bp is connected by cable to the public switched network 2 which is an integrated services digital network (ISDN). The public network includes local exchanges CAA and service access switches CAS, each of which is connected to a local exchange CAA. Each base station is connected to a local exchange via a 2B+D or 30B+D type channel.

The service control point network 3 comprises network service control points PCS-R each connected via the No. 7 network to the service access switches CAS and to a managing service control point PCS-G which is connected to each of the network service control points PCS-R via the X25 network. The service control point network 3 may also include commercial service control points PCS-C each attributed to a service supplier, referred to as an "operator" of the telepoint service, with each "operator" managing a plurality of base stations.

Each network service control point PCS-R governs functions that require processing in real time: calling subscriber authentication; call set-up; and establishing a call "ticket" for billing the call. These functions are no longer performed by the base stations as happens in the prior art. For authentication, each network service control point includes a data base of telepoint subscribers, said data base containing the list of all telepoint subscribers, which list may be distributed over a plurality of PCS-Rs, together with a subscriber blacklist. The data base is updated by the managing service control point PCS-G. This updating takes place simultaneously in all of the data bases as soon as the managing service control point PCS-G is informed of a change relating to a subscriber: new subscriber; subscription terminated; and blacklist. For this purpose, each "operator" has a standard terminal connected to the managing service control point PCS-G. The network service control point PCS-R which process the setting up of calls, control the service access switches CAS for the duration of each call. These network service control points also enable incoming calls to be made to all subscribers whose locations are currently known. Any subscriber wishing to receive a call makes a "localization" request.

The base station which receives this request forwards it over the public network to its parent network service control point PCS-R. The network service control point stores the number of the base station and the number of the subscriber localized in this way, and sends a signal to inform the subscriber that localization has been accomplished. The network service control point is thus capable of processing an incoming call and forwarding it to the called subscriber. Each network service control point is thus also required to perform real time processing of incoming call and localization functions. When an incoming call reaches the network service control point, that point controls the service access switch CAS to which it is connected so as to establish communication with the called subscriber. This feature of enabling subscribers to receive calls does not exist in the prior art.

The base stations in the distribution network of the invention therefore comprise only transmission and reception means adapted to the public switched ISDN with each base station being connected to the ISDN via a 2B+D or a 30B+D type channel, and the other functions normally performed by prior art base stations are now performed by the network service control points PCS-R.

In addition to updating the data bases of the network service control points, the managing service control point PCS-G performs technical management of said network service control points and commercial management of the telepoint service. In order to fit in with a multi-operator environment, this commercial management may be distributed to the commercial service control points PCS-C each associated with a particular "operator."

The access network of the invention enables "operators" to offer additional services to subscribers, e.g. periodic billing (weekly, monthly, etc....) and detailed billing broken down by criteria given by the subscriber, call rerouting (called party busy, date, time, ...).

The invention thus provides improved security in caller authentication. By bringing together functions that have previously been processed by individual base stations in network service control points, PCS-R, it is possible to simplify the said base stations.

This makes fraud much more difficult and greatly simplifies the running of base stations by avoiding any need to read call-charging amounts and to update blacklists in each base station. In addition, problems associated with call charging and observation are improved by eliminating the need to take readings from the base stations while simultaneously processing call tickets automatically in the managing service control point PCS-G, with said processing optionally being distributed to commercial service control points PCS-C.

We claim:

1. An access network for a cordless telephone service, comprising a distribution network constituted by base stations connected by cable to a public switched network, and digital cordless telephones, with each telephone being connected by radio to the same base station throughout the duration of a call; wherein the access network further includes a service control point network having:

network service control points each connected to the public switched network, and each having a data base of cordless telephone service subscribers for processing the following functions in real time: caller authentication; setting up calls; and establishing call-charging tickets; and a managing service control point controlling said data bases and providing commercial management for the cordless telephone service, said commercial management relating to processing call-charging tickets;

said service control point network having the architecture of an intelligent network; and each base station being connected to the public switched network via a 2B+D or 30B+D type channel, said public switched network being an integrated services digital network.

2. An access network according to claim 1, wherein each network service control point also provides real time processing of the following functions: subscriber localization and routing of incoming calls to localized subscribers, with a subscriber being localized by making a localization request from the subscriber's cordless telephone.

3. An access network according to claim 1, also including commercial service control points each associated with an operator of base stations in the distribution network and connected to the managing service control point which serves to distribute commercial management to the commercial service control points.

* * * * *